United States Patent [19]
Ensor et al.

[11] Patent Number: 5,721,780
[45] Date of Patent: Feb. 24, 1998

[54] USER-TRANSPARENT SECURITY METHOD AND APPARATUS FOR AUTHENTICATING USER TERMINAL ACCESS TO A NETWORK

[75] Inventors: Myra L. Ensor; Thaddeus Julius Kowalski, both of Summit; Agesino Primatic, Frenchtown, all of N.J.

[73] Assignee: Lucent Technologies, Inc., Murray Hill, N.J.

[21] Appl. No.: 455,614

[22] Filed: May 31, 1995

[51] Int. Cl.$^6$ .................. H04L 9/32; H04L 9/00
[52] U.S. Cl. .................. 380/25; 380/4; 380/23; 380/49; 340/825.31; 340/825.34
[58] Field of Search .................. 380/4, 23, 25, 380/49, 50, 59, 9, 24; 340/825.31, 825.34

[56] References Cited

U.S. PATENT DOCUMENTS

| 5,003,595 | 3/1991 | Collins et al. | 380/25 |
| 5,301,246 | 4/1994 | Archibald et al. | 380/23 |

Primary Examiner—Bernarr E. Gregory

[57] ABSTRACT

The present invention provides a password authentication security system for a telecommunications network having a plurality of user terminals or subscriber stations communicably coupled to the network. The system comprises a network control center coupled to the subscriber stations, to service provider stations and to network databases via the network. Upon establishment of a communication with a subscriber station, a network coupling identifier comprising in one embodiment the telephone number of the line to which the subscriber station is connected is detected at a telephone switching office and transmitted to the control center. If this is the first time communications have been established between the subscriber station and the network, the received telephone number is encrypted to produce a secret password that is then automatically transmitted to the subscriber station for storage in memory. Upon subsequent communications, the telephone number is again received by the control center where it is encrypted to produce a second password. The first password is then automatically retrieved from memory of the subscriber station independent of user interaction. The two passwords are compared, and the network control center causes the incoming call of the selected user terminal to be connected to a network service provider station, a network database, a network output device or the like if the passwords are at least similar. If the two passwords are not at least similar, the control center causes the incoming call of the selected user terminal to be disconnected, thereby terminating the user terminal's access to the network.

25 Claims, 2 Drawing Sheets

USER-TRANSPARENT SECURITY METHOD AND APPARATUS FOR AUTHENTICATING USER TERMINAL ACCESS TO A NETWORK

BACKGROUND OF THE INVENTION

1. Field of the Invention

This invention relates to password authentication security systems employed in both computer and telecommunications networks.

2. Description of the Prior Art

Network security is becoming increasingly problematic with the recent explosion in networks and network usage. With the emergence of more user-friendly network platforms and easy access to a myriad number of "on-line" databases and services, traditional forms of network security are no longer sufficient to ensure that only authorized users or paying subscribers are able to gain access to secured networks.

In a typical computer network, such as the UNIX™ based system, security is implemented between each user and a network server performing the security checking via a user login and secret password. Upon initial access, the user selects a login to be used as his address on the network and a secret password for use in authentication checking. The user transmits his selection of these to the network server where the secret password is stored in an encrypted database or directory associated with his login. During subsequent connections to the network, the user is queried for both his login and his secret password. The server uses his login to retrieve the stored password and compare it with the password currently provided by the user. An authentication check is performed, and the user is then permitted access to the network if both versions of the password are identical.

This form of password security, however, suffers from the problem that it is dependent upon user-interaction. The user is first required to select or agree upon the password, and then memorize and provide the password to the server each time he desires to access the network. In doing so, many users write down the password in fear that they will forget it, and additionally, do not always ensure that their entry of the password is performed undetected. Accordingly, this type of security system provides the opportunity for someone to take advantage of the unwary user and steal his password in order to gain fraudulent access to the network. Additionally, this unauthorized access could be performed from any terminal connected to the network since the security is dependent upon the password of a particular user instead of the particular connection made to the network.

In a futuristic world where the network user becomes one of a million network subscribers to financial and consumer services, such as home banking and home shopping, the vulnerability of this security system becomes even more important. If the safety of a subscriber's finances for each of a million subscribers were dependent upon the proper conduct of each subscriber, certainly there would be a criminal element ready to take advantage of those subscribers who do not take adequate measures in maintaining the secrecy of their passwords. Furthermore, since the password chosen is user-specific instead of terminal specific, unauthorized access to a subscriber's accounts or services can be made virtually undetected since the violator is not restricted to gaining access from any specific terminal.

Accordingly, it is an object of the present invention to provide a method and apparatus for implementing security in either of a computer or telecommunications network independent of and transparent to the network user or subscriber.

It is another object of the present invention to provide a method and apparatus for securing access to a network service, database or device based upon authentication of a password identifying the specific connection to the network made by the user or subscriber.

It is a further object of the present invention to provide a password security system for securing access to a telephone network wherein the password is initially generated and subsequently authenticated automatically by a network control center through use of an automatic number identification service of the network.

SUMMARY OF THE INVENTION

The present invention provides a method and apparatus for securing access to a telecommunications or computer network service, database or device based upon an automatically determined network coupling identifier and automatically retrieved encrypted password. When access is made to the network from a user terminal or subscriber station, a network control center implementing the security system on the network receives from the network a unique network coupling identifier of the user terminal specifying its coupling to the network. In one embodiment, the network comprises a telephone network and the identifier forms the telephone number of the particular telephone line coupling the user terminal to the network, with the number being determined by an automatic number identification service of the network. In another embodiment, the network comprises a computer network and the identifier forms the network address of a particular terminal, server or user directory.

If this is the first time access is made to the network via the identified coupling of the user terminal to the network, the network control center automatically detects, selects and encrypts the network coupling identifier using a network-resident encryption key to derive a secret, encrypted password. The password is then downloaded into memory of the user terminal unbeknownst to the user.

Upon each subsequent connection to the network by the user terminal, the control center generates another encrypted password using the subscriber's currently detected network coupling identifier and the same network encryption key. The control center then uploads the encrypted password previously stored in memory of the user terminal and compares the two passwords. If they match, this signifies that the same user terminal is requesting access from the same network coupling, and security is maintained independently of any user interaction. If the two passwords do not match, the user is then notified of the problem and the network connection is terminated by the network control center in the assumption that either the password or the user terminal's coupling to the network has been tampered with.

DETAILED DESCRIPTION

Figure 1:
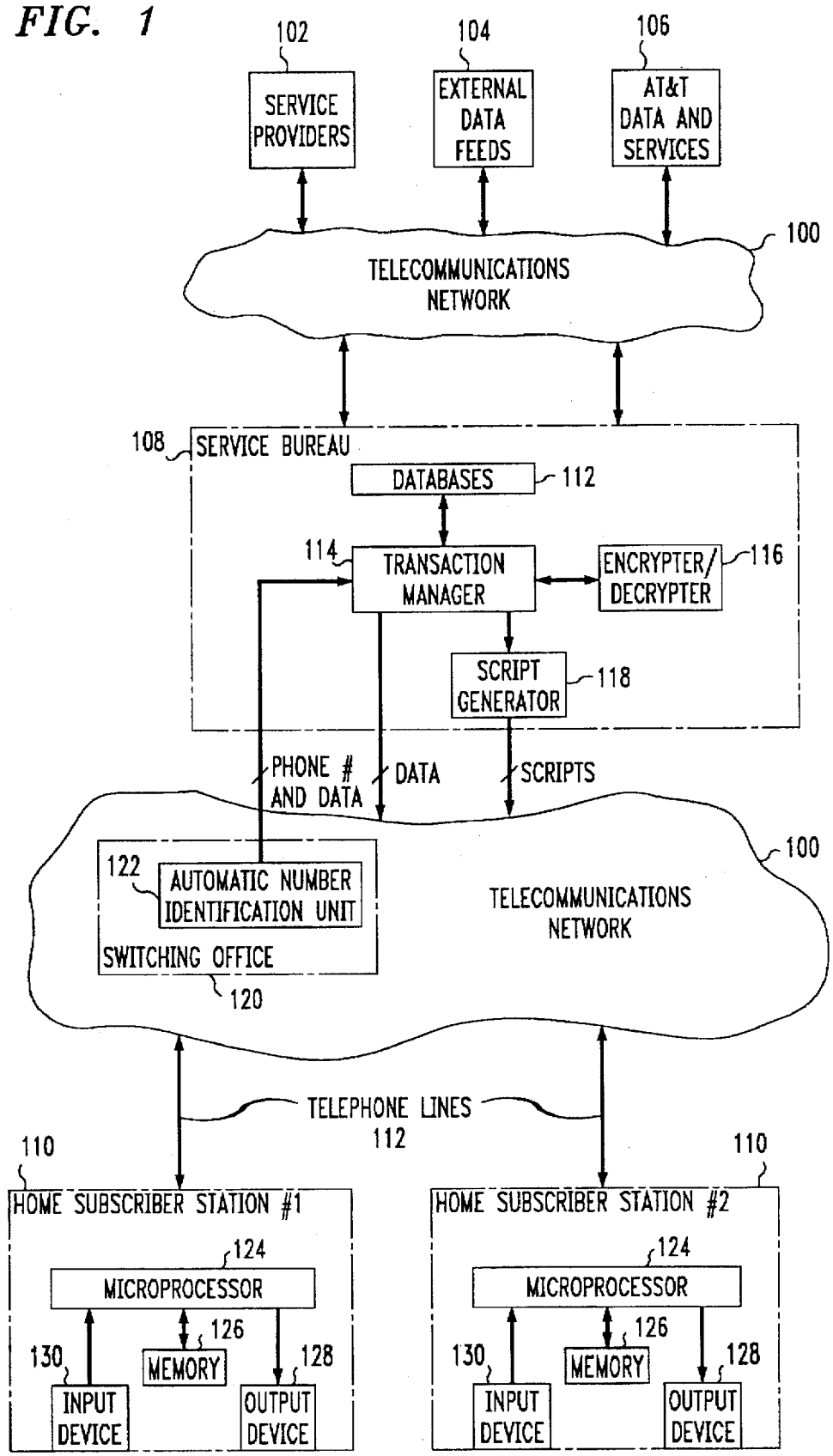
FIG. 1 is a block diagram of a telecommunications network embodying the present invention in which a plurality of subscriber stations are coupled to each of a network service bureau, a plurality of service provider stations and a plurality of data feeds and databases.

The present invention provides a password authentication security system for a network 100, 200 having a plurality of user terminals 110, 202 communicably coupled to the network 100, 200. As shown respectively in FIGS. 1 & 2, the system may be implemented in either of a telecommunications network 100 or a computer network 200 each having a network control center 108, 206 coupled to the network 100, 200 for monitoring and/or managing access and communications to the network 100, 200 by the user terminals 110, 202. The user terminals 110, 202 are coupled to the network 100, 200 via a uniquely identifiable network coupling 112, 212 such as an assigned data communications channel, the address of a network node or remote terminal link, or a dedicated telephone line into a telephone network.

Figure 2:
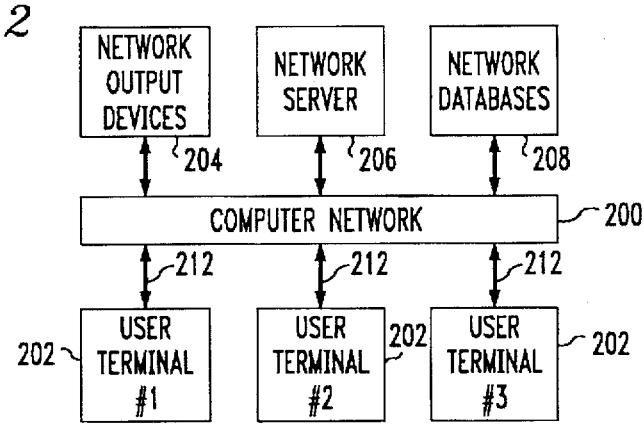
FIG. 2 is a block diagram a computer network embodying the present invention in which a plurality of user terminals are coupled to a network server, a network database and a network output device.

Referring to the computer network 200 shown in FIG. 2, the network control center comprises a server 206 and associated databases 208 coupled to a plurality of user terminals 202 and network output devices 204 via a computer network 200 such as a LAN or WAN. Access to the computer network 200 is typically monitored and performed by an access control unit of the network server (not shown). When connection to the network 200 is requested by a user, the access control unit recognizes the network address of the user terminal 202 or location, which may include its local network server address, its remote link address to a sub-net and the user's assigned network directory. The control unit determines the availability of a connection slot to the server 206 and determines whether the user has authorization to access the network devices 204 and/or databases 208.

Referring to FIG. 1, a telecommunications network 100, such as a wired network, a wireless network, a satellite network, a fiber optic cable network, a coaxial cable network or the like, is shown having a network control center 108 forming a network service bureau. The service bureau 108 is coupled to the plurality of user terminals 110 forming home or business subscriber stations, to service provider stations 102 and to external data feeds 104 and databases 106 via the network 100. In this embodiment, the service bureau 108 acts as an intermediate transmission station for the provision of on-line services from service providers 102 and data from external data feeds 104 and external databases 106 to terminal devices in home and business subscriber stations 110. To accomplish this, the service bureau 108 includes microprocessor logic 114 such as a transaction manager, internal databases 112 and a script generator 118 for managing network connections, network password authentications, data communications and script messaging to the subscriber stations 110.

The service bureau 108 also enables the downloading of software to the terminals of the subscriber stations 110 for the purpose of upgrading terminal software to implement new hardware features and/or services and for providing new terminal-resident software applications. In the embodiment of the subscriber device discussed below, specific, terminal-resident software may be licensed and downloaded to the terminal from the service bureau 108 so as to control and manage the operation of other devices that may be coupled to the terminal either directly or via a home network.

One advantage of the invention in such an application is that a user who has a subscriber terminal but is not registered for a particular service is prevented from fraudulently downloading software via another, registered user's network connection (i.e. telephone line) by hooking up his terminal to the registered user's network connection. Fraudulent copying of the software once downloaded is further inhibited by providing subscriber terminals which, due to the fact that they need not be computer systems, do not have alternate input/output devices (i.e. floppy drives) by which the software can be copied.

The subscriber stations 110 may comprise practically any terminal device adapted to connect to a telecommunications network 100 via conventional methods having a microprocessor 124 for processing data and managing network transactions, a transceiver for transmitting and receiving data (not shown), memory 126 for data storage (volatile and/or non-volatile), a user input device 130 (i.e. keyboard, mouse, remote control, etc.) for receiving input directly from the user, and a user output device 128 (i.e. display, audio speaker, etc.) for presenting messages and data to the user. Non-limiting examples of such terminal devices 110 include telephone handsets, telephone answering systems and computer systems.

In a particular example of a terminal device 110 for a home subscriber station (not shown in the figures), a home telephone answering system is coupled to a television via standard audio/video inputs/outputs, to a cable channel tuner via standard RF inputs/outputs and a telephone network via standard RJ11 telephone jacks. The system comprises a remote control as an input device and a television display monitor as an output device, and further includes

- a microprocessor with memory for managing network transactions and processing data,
- a call signal processing unit for processing incoming and outgoing calls,
- a digital signal processing unit for processing digital signals, detecting DTMF tones, reporting information to the microprocessor, and interacting with the call signal processing unit for implementing a digital answering machine and a data modem, and
- a video modulator/encoder unit for receiving, processing and transmitting signals between the remote control, the cable channel tuner and the television monitor.

In the above described embodiment, a typical transaction between a subscriber and the service bureau 108 consists of the subscriber instructing the terminal device 110 of the subscriber station to initiate a call to the service bureau 108. This is accomplished by powering up the terminal 110 and choosing from a menu selection generated on the terminal display 128 one of an "on-line services" option and a "software download" option. The terminal 110 then initiates a modem call to the service bureau 108, and after the modem handshake is completed, an automatic, user-transparent authentication handshake is initiated.

Figure 3:
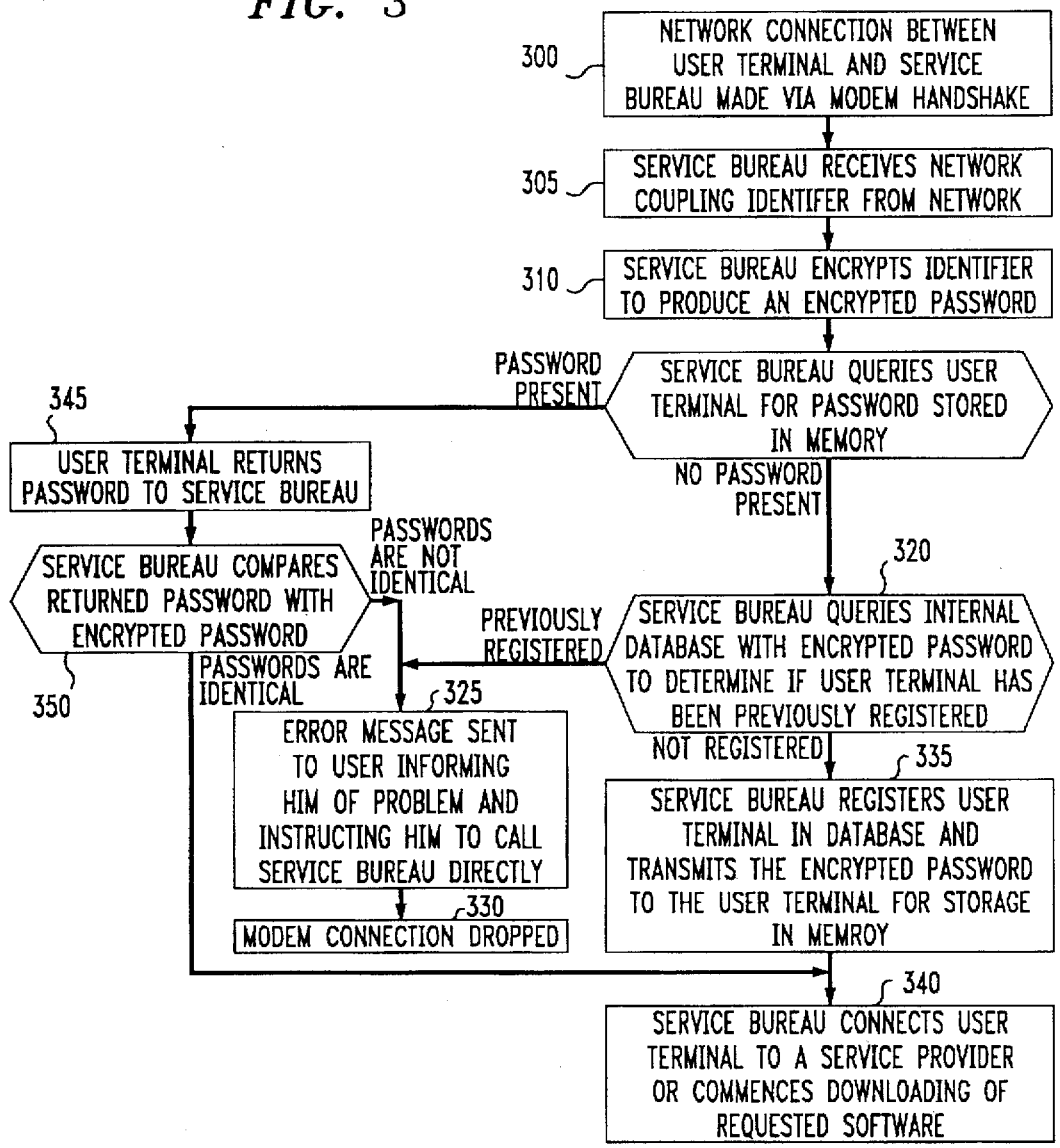
FIG. 3 is a flow chart illustrating the password authentication process implemented in a telecommunications network and performed in accordance with the present invention.

As shown in the flow chart of FIG. 3, the authentication handshake is performed by the service bureau transaction manager 114 (FIG. 1) first receiving from the network 100 a unique, network coupling identifier for the particular terminal 110 attempting to gain access to the network 100 through the service bureau 108. In the case of a conventional telephone network 100, this identifier comprises the telephone number associated with the dedicated telephone line coupling the terminal 110 to the network 100. This telephone number is obtained, for example, in a conventional manner through detection of the number by an automatic number identification unit or service 122 employed within a connected telephone network switching office 120. If, however, the automatic number identification service 122 does not for some reason provide the terminal's telephone number, then the service bureau transaction manager 114 downloads a script message to the terminal 110 requesting the subscriber to directly provide his telephone number through use of the associated input device 130.

Once the telephone number of the particular terminal 110 has been received, the transaction manager 114 sends this number to an encryption/decryption unit of the service bureau 108. The number is encrypted through the use of a conventional encryption generator (not shown) to produce a secretly, encrypted password. The transaction manager 114 subsequently requests the microprocessor 124 of the terminal 110 to retrieve from a predetermined location in memory 126 any password that might have been previously stored in that location. If no password is found in the memory location, the terminal microprocessor 124 informs the transaction manager 114 of this condition, and the transaction manager 114 then queries the service bureau's internal databases 112 to determine if that particular terminal 110 has already been registered by the service bureau 108. This is done by comparing the encrypted password against a list of encrypted passwords used to identify the registered accounts of all terminals 110 stored in the service bureau internal database 112.

If no match between encrypted passwords is found in the comparison, this signifies that the terminal 110 has not been previously registered. Accordingly, the transaction manager 114 registers this particular terminal 110 by creating a subscriber registration account in the database 112 identified by the newly encrypted password. The transaction manager 114 further transmits the newly encrypted password to the terminal 110 for storage in the predetermined location of memory 126 such that upon a subsequent authentication handshake, the terminal 110 will be determined to have been previously registered. Finally, the service bureau 108 proceeds with the transaction by downloading requested software to the terminal 110 or by coupling the terminal 110 to a service provider 102. The coupling to the service provider 102 is performed by either forwarding (or relaying) the incoming call to the service provider 102 or providing the service provider's telephone number to the terminal 110 so that it may make a direct connection thereto through a subsequent call.

If, however, there is a match between the newly encrypted password and the database listing of encrypted passwords, this signifies either that the password that should have been in the terminal's memory 126 has been tampered with or that there was a hardware failure in reading the password from memory 126 or in transmitting it to the service bureau 108. In either case, an error message is sent and displayed on the terminal's output device 128 to inform the subscriber about the problem and instruct the subscriber to make a voice call to the service bureau 108 to resolve the problem. The transaction manager 114 then instructs the network 100 to terminate the modem connection to disconnect the subscriber from the network 100.

If the transaction manager's request to the terminal 110 to retrieve a password stored in the predetermined location in memory 126 does return a password, this then signifies that the terminal 110 has already been registered in a previous transaction. In this case, the transaction manager 114 compares the newly encrypted password with the retrieved password for authentication purposes. If the two passwords are not identical, then an error message is sent to the terminal 110 to indicate to the subscriber that the authentication has failed due to tampering with the password stored in the terminal's memory 126, a hardware failure, or a mismatch between the particular terminal 110 and the dedicated telephone line 112. Again, the subscriber is instructed to make a voice call to the service bureau 108 to resolve the problem and the modem connection is terminated. If, however, the two passwords are determined to be identical, then the authentication handshake has completed successfully, and the service bureau 108 proceeds with the transaction by downloading requested software to the terminal 110 or by coupling the terminal 110 to a service provider 102.

It is noted that although it is preferable to perform a password comparison for an identical match in order to determine whether to allow access to the network 100, 200, it would also be advantageous to perform a password comparison wherein access is allowed either when the passwords are only similar or when only portions of the passwords actually match. This would be advantageous when, for example, it is desirable to allow access to each user within a given group of network users. Accordingly, for a computer network 200, this would enable all users on a given sub-network to gain access to the network 200 by virtue of the fact that each user's network address specifies that sub-network. For a telephone network 100, this would similarly enable all subscribers within a given geographical area (serviced by a particular switching office) to gain access to the network 100 by virtue of the fact that the telephone number for each subscriber includes the same geographical trunk number.

Additionally, it is foreseen that this automatic, user-transparent password authentication system can be made even more reliable by implementing a process in the network control center 108, 206 for automatically changing the passwords stored within the memory 126 of the user terminals 110, 202 and updating the corresponding list of passwords stored in the control center's internal database 112, 208. This would be accomplished after an initial password authentication for a selected user terminal 110, 202 by encrypting the network coupling identifier using a different encryption key produced by the network control center 108, 206. The network control center 108, 206 then automatically replaces the original password in each of its own internal database 112, 208 and the predetermined (or an alternate) memory location 126 of the user terminal 110, 202 without the user's knowledge. Additionally, when the identifier is encrypted, an expiration date may be added to the password to apprise service providers of whether the user is currently registered with the network and/or a particular service.

While the embodiments described herein disclose the primary principles of the present invention, it should be understood that these embodiments are merely illustrative since various additions and modifications, which do not depart from the spirit and scope of the invention, are possible. For example, in the scenario of subscriber transactions with a network service bureau for the provision of services and information from the network to the subscriber, the invention may be used to uniquely identify the subscriber with his subscriber account maintained at the service bureau via the telephone number assigned to the subscriber's telephone by the network. Although the subscriber may relocate to a different residence or subscriber station, re-assignment of the subscriber's old telephone number to the new subscriber station will enable the service bureau to maintain the association of the subscriber with the previous account despite relocation. Accordingly, the forgoing Detailed Description is to be understood as being in all cases descriptive and exemplary but not restrictive, and the scope of the invention is to be determined not from the Detailed Description, but rather from the claims as interpreted according to the full breadth permitted by the patent laws.

What is claimed:

1. A method for determining whether access to a network from a selected one of a plurality of user terminals in communication through the network is authorized, each of the plurality of user terminals having an identifier for distinguishing one of the user terminals from the remainder of the user terminals within the network, the method comprising the steps of:

detecting the identifier of the selected user terminal upon establishment of a communication between the network and the user terminal, the identifier containing information of the user terminal's coupling to the network;

retrieving from the user terminal a password;

comparing the identifier and the password;

allowing access to the network for the selected user terminal if a first predetermined portion of the identifier and a second predetermined portion of the password satisfy a predetermined relation between the first predetermined portion of the identifier and the second predetermined portion of the password; and denying access to the network for the selected user terminal if the first predetermined portion of the identifier and the second predetermined portion of the password do not satisfy the predetermined relation between the first predetermined portion of the identifier and the second predetermined portion of the password, wherein the detecting, retrieving and comparing steps are automatically performed independent of and transparent to the user by a network control center in communication with the network.

2. The method of claim 1, wherein the network comprises a telecommunications network selected from the group consisting of a wired network, a wireless network, a satellite network, a fiber optic cable network and a coaxial cable network and the step of detecting the identifier comprises the step of detecting the communications channel of an incoming call from the selected user terminal.

3. The method of claim 1, wherein the network comprises a telephone network and the step of detecting the identifier comprises the step of detecting the telephone number of an incoming call from the selected user terminal.

4. The method of claim 3, wherein the step of detecting the telephone number of an incoming call from the selected user terminal comprises the step of receiving the incoming call's telephone number from an automatic number identification unit of a telephone network switching office.

5. The method of claim 3, wherein the steps of allowing access to the network and denying access to the network comprise the steps of:

coupling the incoming call of the selected user terminal to one of a network service, a network database and a network output device if the first predetermined portion of the identifier and the second predetermined portion of the password satisfy the predetermined relation between the first predetermined portion of the identifier and the second predetermined portion of the password; and disconnecting the incoming call of the selected user terminal from the network if the first predetermined portion of the identifier and the second predetermined portion of the password do not satisfy the predetermined relation between the first predetermined portion of the identifier and the second predetermined portion of the password.

6. The method of claim 1, wherein the network comprises a computer network and the step of detecting the identifier comprises the step of detecting the network address of one of a server managing a local network to which the user terminal is connected, a remote link through which the user terminal is coupled to the network and a home directory of the network or a sub-network of the network.

7. The method of claim 1, wherein the network comprises a telecommunications network further in communication with at least one service provider station for downloading software and service information from the station to user terminals, with the network selected from the group consisting of a wired network, a wireless network, a satellite network, a fiber optic cable network and a coaxial cable network, and wherein the step of detecting the identifier comprises the step of detecting the telephone number of an incoming call from the selected user terminal.

8. The method of claim 1, wherein the step of retrieving from the user terminal a password comprises the step of reading from memory provided in the user terminal a password previously stored in memory.

9. The method of claim 1, wherein the step of comparing the identifier and the password further comprises the step selected from the group of steps consisting of:

encrypting the identifier to produce an encrypted password for comparison with the password received from the user terminal, and decrypting the password to produce a decrypted identifier for comparison with the detected identifier.

10. The method of claim 1, wherein the steps of allowing access to the network for the selected user terminal if the first predetermined portion of the identifier and the second predetermined portion of the password satisfy the predetermined relation between the first predetermined portion of the identifier and the second predetermined portion of the password, and denying access to the network for the selected user terminal if the first predetermined portion of the identifier and the second predetermined portion of the password do not satisfy the predetermined relation between the first predetermined portion of the identifier and the second predetermined portion of the password comprise the steps of:

allowing access to the network for the selected user terminal if the identifier and the password are identical; and denying access to the network for the selected user terminal if the identifier and the password are not identical.

11. The method of claim 1, wherein upon establishment of a first communication between the network and the user terminal, the method further comprises the steps of:

detecting the identifier of the selected user terminal upon establishment of the first communication between the network and the user terminal, the identifier containing information of the user terminal's coupling to the network;

encrypting the identifier to generate a secret password; and transmitting the password to the user terminal via the network for storage in memory of the user terminal.

12. In a security system for authenticating access to a network from a selected one of a plurality of user terminals in communication through the network, each of the plurality of user terminals having an identifier for distinguishing one of the user terminals from the remainder of the user terminals within the network, a method is provided for selecting and passing to the selected user terminal a password used to obtain access to the network, the method comprising the steps of:

detecting the identifier of the selected user terminal upon establishment of a communication between the network and the user terminal, the identifier containing unique information of the user terminal's coupling to the network;

encrypting the identifier to generate a secret password; and transmitting the password to the user terminal via the network.

13. The method of claim 12, wherein the detecting, encrypting and transmitting steps of the method are automatically performed independent of and transparent to the user by a network control center in communication with the network.

14. The method of claim 12, wherein the network comprises a telecommunications network selected from the group consisting of a wired network, a wireless network, a satellite network, a fiber optic cable network and a coaxial cable network and the step of detecting the identifier comprises the step of detecting the communications channel of an incoming call from the selected user terminal.

15. The method of claim 12, wherein the network comprises telephone network and the step of detecting the identifier comprises the step of detecting the telephone number of an incoming call from the selected user terminal.

16. The method of claim 15, wherein the step of detecting the telephone number of an incoming call from the selected user terminal comprises the step determining the incoming call's telephone number from an automatic number identification unit of a telephone network switching office.

17. The method of claim 12, wherein the network comprises a computer network and the step of detecting the identifier comprises the step of detecting the network address of the users terminal's coupling to the computer network.

18. The method of claim 12, wherein the network comprises a telecommunications network further in communication with at least one service provider station for downloading software and services from the station to user terminals, with the network selected from the group consisting of a wired network, a wireless network, a satellite network, a fiber optic cable network and a coaxial cable network, and wherein the step of detecting the identifier comprises the step of detecting the telephone number of an incoming call from the selected user terminal.

19. The method of claim 12, wherein the step of transmitting the password to the user terminal via the network comprises the step of storing the password in memory of the user terminal.

20. The method of claim 12, wherein the step of transmitting the password to the user terminal via the network comprises the step of storing the password in memory of the user terminal, and wherein upon a selected subsequent establishment of a communication between the network and the user terminal, the method further comprises the steps of:

detecting the identifier of the selected user terminal upon establishment of a communication between the network and the user terminal, the identifier containing information of the user terminal's coupling to the network;

encrypting the identifier to generate a second secret password different form the first secret password; and transmitting the second password to the user terminal via the network to replace the first secret password stored in memory of the user terminal.

21. In a security system for a telecommunications network having a plurality of user terminals in communication through the network, an apparatus is provided for authenticating access to the network from a selected one of the plurality of user terminals having memory, each of the plurality of user terminals having an identifier for distinguishing one of the user terminals from the remainder of the user terminals within the network, the apparatus comprising:

a network control center in communication with the network for receiving the identifier from memory of the selected user terminal upon establishment of a communication between the network and the user terminal, the identifier comprising one of a communications channel indicator, a network address and a telephone number of an incoming communication from the selected user terminal, the network control center comprising comparison logic for comparing the identifier with a password read from a predetermined location in memory of the selected user terminal, and a switch for allowing or denying access to the network for the selected user terminal based upon the result of the comparison.

22. The apparatus of claim 21, wherein the network control center automatically receives the identifier from the user terminal and the comparison logic automatically compares the identifier with the password upon establishment of the communication independent of and transparent to the user.

23. The apparatus of claim 21, wherein the telecommunications network comprises one of a wired network, a wireless network, a satellite network, a fiber optic cable network and a coaxial cable network, and the apparatus further comprises a switching office of the telecommunications network having an automatic number identification unit for detecting the telephone number of an incoming communication from the selected user terminal.

24. The apparatus of claim 23, wherein the network control center causes the incoming call of the selected user terminal to be connected to one of a network service provider station, a network database and a network output device if a first predetermined portion of the identifier and a second predetermined portion of the password satisfy a predetermined relation between the first predetermined portion of the identifier and the second predetermined portion of the password, and further causes the incoming call of the selected user terminal to be disconnected from the network if the first predetermined portion of the identifier and the second predetermined portion of the password do not satisfy the predetermined relation between the first predetermined portion of the identifier and the second predetermined portion of the password.

25. In a telecommunications system comprising a network service bureau having subscriber accounts and being in communication with one or more subscriber stations via a telecommunications network for the provision of services and information from the network to subscribers located at the subscriber stations, a method is provided for uniquely associating each subscriber with a corresponding subscriber account maintained at the service bureau upon establishment of communications between the subscriber and the service bureau, the method comprising the steps of:

creating a subscriber account for each subscriber upon initial communication between the subscriber and the service bureau;

associating the subscriber account with a unique telephone number provided by the subscriber, the telephone number being assigned by the telecommunications network to a first subscriber station from which the subscriber currently establishes communications with the service bureau and recorded at the service bureau for future use in associating the subscriber with the subscriber account;

detecting the telephone number generated by an automatic number identification service of the network upon subsequent establishments of communication between the subscriber and the service bureau; and selecting the subscriber account associated with the generated telephone number;

wherein when the subscriber selects a second different subscriber station for establishing communications with the service bureau, the method further comprises the step of the telecommunications network assigning the same unique telephone number to the second subscriber station such that upon call establishment between the subscriber from the second subscriber station to the service bureau, the previously created subscriber account will be selected for the subscriber.

* * * * *